April 30, 1940.　　　D. TUCK ET AL　　　2,199,057
COLOR CAMERA
Filed Feb. 21, 1939　　　2 Sheets-Sheet 1

April 30, 1940. D. TUCK ET AL 2,199,057
COLOR CAMERA
Filed Feb. 21, 1939 2 Sheets-Sheet 2

Patented Apr. 30, 1940

2,199,057

UNITED STATES PATENT OFFICE 2,199,057

COLOR CAMERA

Desmond Tuck and Alfred Thomas Stickland, London, England

Application February 21, 1939, Serial No. 257,612
In Great Britain September 1, 1937

3 Claims. (Cl. 88—16.4)

This invention relates to color cameras and refers particularly to a camera for use in a system of color photography in which a plurality of color separated pictures are prepared by exposures through screens or filters of different colors.

The primary object of the invention is the provision of an improved means for obtaining color separated pictures in this manner from either still or moving objects.

In order that the invention may be the more clearly understood an apparatus in accordance therewith will now be described reference being made to the accompanying drawings, wherein.

Figure 1:
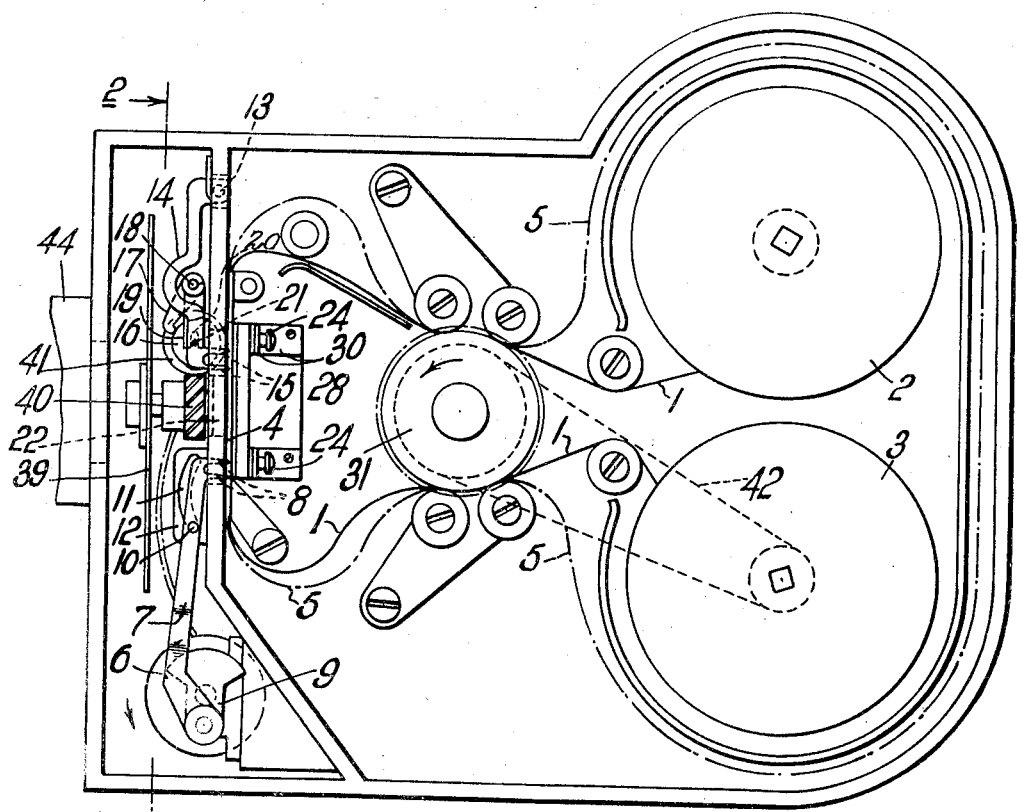
Figure 1 is a side elevation of said camera with the cover removed.
Figure 3:
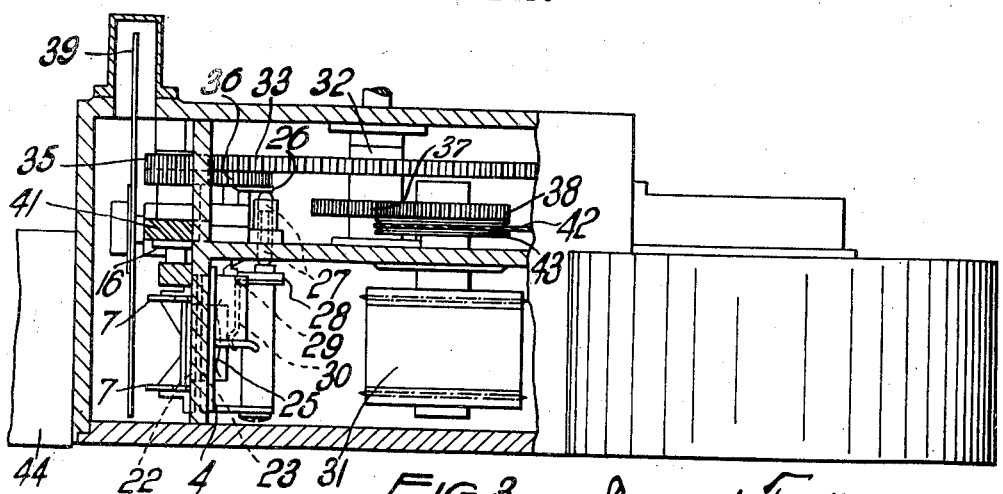
Figure 3 is a fragmentary part sectional plan of the same.
Figures 2, 4:
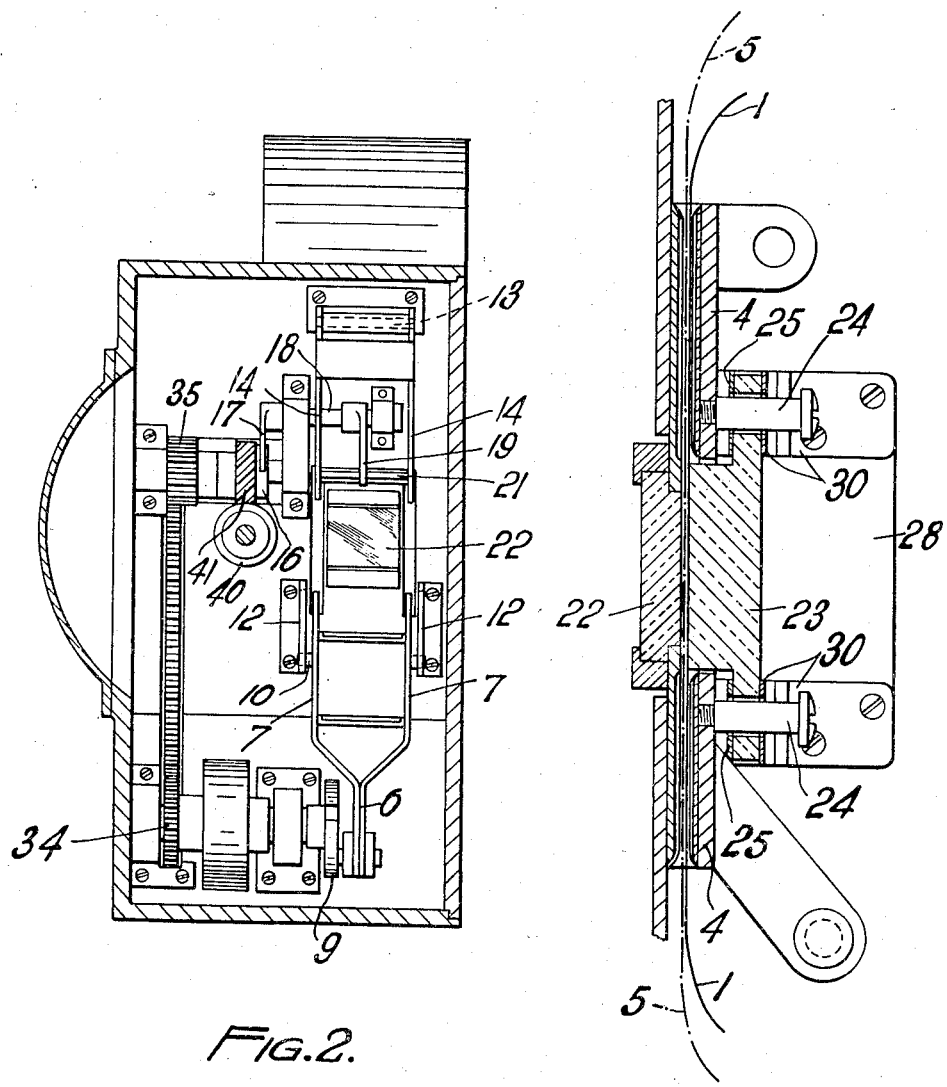
Figure 2 is a front elevation of the same shown in section on the line 2—2 of Figure 1.
Figure 4 is a sectional side elevation to an enlarged scale illustrating a detail.

Referring to these drawings, the camera is adapted to take a series of photographs at cinematograph speed through say four different filter colors successively, so that successive pictures are taken through successive filters of say red, yellow, blue and grey key, red, yellow, blue and grey key and so on.

The film 1 to be exposed is run from a reel 2 to a reel 3, passing through the gate 4 of the camera. The color filters are formed by coloring an endless film 5 with the required colors repeated successively throughout its length and this endless film 5 is fed, simultaneously with the film 1 through the gate 4 of the camera and is caused to register with the film 1 so that the successive pictures are taken through the successive colors as stated.

The two films 1 and 5 are fed simultaneously step by step through the gate by means of a feed lever 6 having forked arms 7 each of which carries at its end two teeth 8, said lever being adapted to oscillate in such a way that the teeth 8 enter holes at both sides of the two films, draw said films downwardly through one step, and then leave said holes, return upwardly and again enter holes and draw the films down through the next step.

This oscillating movement to the lever 6 is given by pivoting its lower end to a continuously rotating crank 9 and guiding its upper end by the engagement of two pins 10 on the arms 7 in two curved slots 11 formed in fixed plates 12. The crank 9 rotates in the direction of the arrow, and it will be seen that in the position shown, the teeth 8 have reached the lower extremity of their travel. When the crank 9 continues through the next half of its cycle the teeth 8 will be withdrawn from the holes in the films owing to the crank being on the right (according to Figure 1) but when the crank returns through the subsequent half of its cycle the teeth 8 will enter, and be maintained in, the holes owing to the crank being now on the left.

During each stationary period of the films when the teeth 8 are out of engagement with the films, said films are positively locked against movement by means of a pivoted frame which is pivotally mounted at one end on a rod 13 and whose side members 14 carry teeth 15 similar to the teeth 8. This frame is rocked about said rod 13 periodically so that its teeth 15, during the period when the films are at rest, engage side holes of the films and thereby positively maintain said films against movement.

The rocking of this frame is effected by means of a permanently rotating cam 16 which engages one arm 17 of a bell crank lever rotatable upon a rod 18, the other arm 19 of said bell crank having a slot 20 formed in its extremity which engages a cross rod 21 which extends between the side members 14 of the pivoted frame. Thus, as the bell crank lever is rocked by the cam, it will be clear that the frame will be correspondingly rocked by the engagement of the slot 20 and rod 21.

Further, during the stationary period of the films, said films, at the region of the exposure, are pressed together between two panes of glass 22 and 23. The outer pane 22 is fixed; the inner pane 23 is mounted so as to be horizontally slidable on two studs 24 mounted on the gate 4 and is pressed forwardly towards the outer pane during each period of rest so as to squeeze the films between said panes and maintain them in good contact.

Thus the inner pane 23 is biased rearwardly by means of two flat springs 25 in compression between the upper and lower ends of said pane and the gate 4, and is adapted to be pressed forwardly in opposition to said springs 25 by the action of a cam 26 which periodically presses a plunger 27 whose further end engages a plate 28 pivoted at 29 and carrying two leaf springs 30 whose ends engage the upper and lower ends of the pane 23 at the back. Each time the plunger 27 is pressed downwards the plate 28 is rocked about its axis 29, thereby causing the leaf spring 30 to press the pane 23 forwardly. When the cam 26 permits, the pane 23 is again pressed rearwardly by the springs 25.

In addition to the intermittent feed mechanism, the films 1 and 5 are continuously fed by means of a feed sprocket 31 co-operating with rollers as will be clear from the drawings.

The whole mechanism is driven from a main shaft 32 having thereon a toothed wheel 33. The crank 9 is driven through a pinion 34 which is mounted on the same shaft as said crank and is in mesh with said toothed wheel 33. The cam 16 is driven through a pinion 35 on the same shaft as said cam and in mesh with said toothed wheel 33. The cam 26 is mounted as shown on one face of a pinion 36 which is also in mesh with the pinion 35. The feed sprocket 31 is driven through a gear wheel 37 mounted on the shaft 32 in engagement with a gear wheel 38 mounted on the same shaft as said sprocket.

The camera is provided with the usual rotating shutter 39. This is mounted on the same shaft as a skew gear 40 which is in mesh with a skew gear 41 at right angles to it and mounted on the same shaft as the pinion 35 and cam 16.

The reference 42 designates a slipping belt by which the reel 3 is loosely driven from a grooved wheel 43 on the shaft of the pinion 38. The reference 44 designates the lens carrier.

It is deemed that the remaining parts, consisting principally of the casing, bearings, guide elements and the like, and all of more or less conventional design, are sufficiently clear from the drawings.

In the usual application of the invention selected negatives produced on the film 1 will be employed for producing finished color pictures by various processes of printing on paper or other material.

The color screens are so prepared and graded that the exposure required through each is the same and may be of very short duration.

Finished color pictures may be obtained from the color separated pictures by various processes of printing on paper or other material.

What we claim and desire to secure by Letters Patent is:

1. A camera for taking color photographs in which a plurality of color separated pictures are prepared by exposure through successive screens of different colors, comprising means having an exposure opening, a screen strip having a plurality of sequences of differently colored areas thereon, means imparting simultaneous step by step feeding movement to a sensitized film and said screen strip across said exposure opening, means actuated from said feeding means for locking said film and said strip in registered relation upon the conclusion of each step of movement thereof, and releasing said film and said strip prior to the next feeding movement thereof, a transparent plate co-extensive with said exposure opening, a rear plate of substantially the same area as said transparent plate movably mounted in relation to said transparent plate, means normally biasing said movable plate away from said other plate, means actuated from said feeding mechanism for imparting movement to said movable plate, and means for exposing said sensitive film through said opening and said strip while said strip and said film are locked against movement and are pressed between said plates.

2. A camera for taking color photographs in which a plurality of color separated pictures are prepared by exposure through successive screens of different colors, comprising means having an exposure opening, a screen strip having a plurality of sequences of differently colored areas thereon, means imparting simultaneous step by step feeding movement to a sensitized film and said screen strip across said exposure opening, including a gear train, an oscillatory toothed element adapted to enter sprocket openings in said film and said screen strip, a cam carried by one of the gears of said train and operative upon said toothed element, whereby said toothed element will be engaged with said film and said strip upon the conclusion of each step movement thereof to lock said film and said strip and to be disengaged from said film and said strip prior to the succeeding movement thereof, a transparent plate co-extensive with said exposure opening, an oscillatory rear plate of substantially the same area as, and mounted adjacent said transparent plate, means normally biasing said movable plate away from said other plate, a cam carried by another gear of said train, means actuated by said cam operative upon said movable plate, said cam being so set as to develop clamping action upon said film and said strip substantially simultaneously with the actuation of said toothed element, and means for exposing said sensitive film through said opening and said strip while said strip and said film are locked against movement and are pressed between said plates.

3. A camera for taking color photographs in which a plurality of color separated pictures are prepared by exposure through successive screens of different colors, comprising means having an exposure opening, a screen strip having a plurality of sequences of differently colored areas thereon, means imparting simultaneous step by step feeding movement to a sensitized film and said screen strip across said exposure opening, including a gear train, an oscillatory toothed element adapted to enter sprocket openings in said film and said screen strip, a cam carried by one of the gears of said train and operative upon said toothed element, whereby said toothed element will be engaged with said film and said strip upon the conclusion of each step movement thereof to lock said film and said strip and to be disengaged from said film and said strip prior to the succeeding movement thereof, a transparent plate co-extensive with said exposure opening, an oscillatory rear plate of substantially the same area as, and mounted adjacent said transparent plate, springs normally biasing said movable plate away from said other plate, a cam carried by another gear of said train, means actuated by said cam including springs operative upon said movable plate, said cam being so set as to develop clamping action measured by the tension of the springs acting upon said movable plate upon said film and said strip substantially simultaneously with the actuation of said toothed element, and means for exposing said sensitive film through said opening and said strip while said strip and said film are locked against movement and are pressed between said plates.

DESMOND TUCK.
ALFRED THOMAS STICKLAND.